United States Patent
Mills et al.

(10) Patent No.: US 6,454,496 B1
(45) Date of Patent: Sep. 24, 2002

(54) SYSTEM FOR LOADING AND UNLOADING POLYSTYRENE PELLETS INTO AND FROM A TRAILER

(75) Inventors: Suzanne M. Mills, Chesapeake; William J. Grenier, Portsmouth; Nelson Wilber, Virginia Beach; Donald R. Rogers, Chesapeake, all of VA (US)

(73) Assignee: Berry Plastics Design Corporation, Suffolk, VA (US)

( * ) Notice: Subject to any disclaimer, the term of this patent is extended or adjusted under 35 U.S.C. 154(b) by 0 days.

(21) Appl. No.: 09/672,902

(22) Filed: Sep. 29, 2000

Related U.S. Application Data

(60) Provisional application No. 60/156,822, filed on Sep. 30, 1999.

(51) Int. Cl.[7] .................................................. B60P 1/60
(52) U.S. Cl. ........................ 406/41; 406/146; 406/151; 406/155; 406/157
(58) Field of Search ............................ 406/38, 86, 146, 406/151, 155, 157, 41

(56) References Cited

U.S. PATENT DOCUMENTS

| | | | |
|---|---|---|---|
| 1,507,864 A | * | 9/1924 | Smith ........................ 406/74 |
| 3,876,260 A | | 4/1975 | Moss et al. |
| 3,917,354 A | | 11/1975 | Adams, Jr. |
| 4,088,373 A | * | 5/1978 | White ........................ 302/53 |
| 4,147,392 A | | 4/1979 | Fuss |
| 4,665,956 A | | 5/1987 | Freeman |
| 4,819,700 A | | 4/1989 | Sommer et al. |
| 4,896,706 A | | 1/1990 | Tanner et al. |
| 5,199,826 A | | 4/1993 | Lawrence |
| 5,346,101 A | | 9/1994 | Hargis et al. |
| 5,575,316 A | | 11/1996 | Pollklas |
| 5,749,683 A | | 5/1998 | Kunse |
| 6,296,424 B1 | * | 10/2001 | Eckel et al. ................... 406/91 |

* cited by examiner

*Primary Examiner*—Christopher P. Ellis
*Assistant Examiner*—Joe Dillon, Jr.
(74) *Attorney, Agent, or Firm*—Barnes & Thornburg

(57) ABSTRACT

The invention is an apparatus for loading and unloading pellets into a trailer. Conduits are positioned with at least one opening configured to direct flow toward a central longitudinal axis of the interior region. A blower is connected to an input port, and a suction device is connected to an output port to cause a flow of moving air so that pellets within the interior region are carried with the flow toward the central longitudinal axis, the collector and an output port. A pellet loading pipe has a plurality of spaced openings and deflection plates upstream of each opening. Pellets in the pipe are deflected from the openings until a clog develops downstream, at which time the pellets will exit an opening adjacent the clog until it clogs, and continuing successively until the longitudinal spaced opening proximate the loading port becomes clogged and the interior region is substantially full.

18 Claims, 8 Drawing Sheets

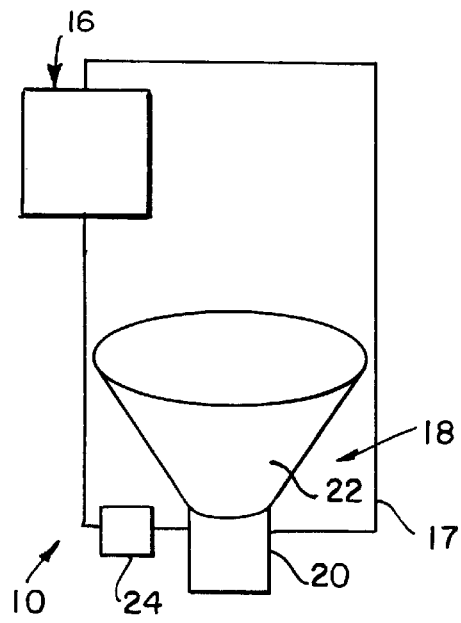
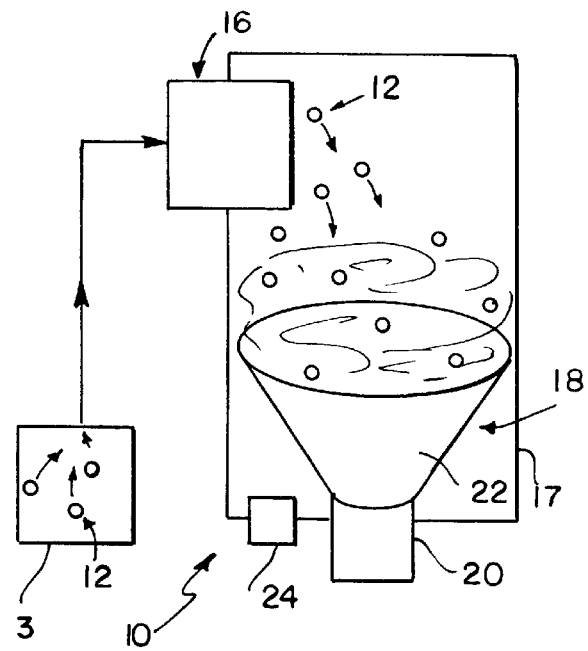
FIG. 1
FIG. 2
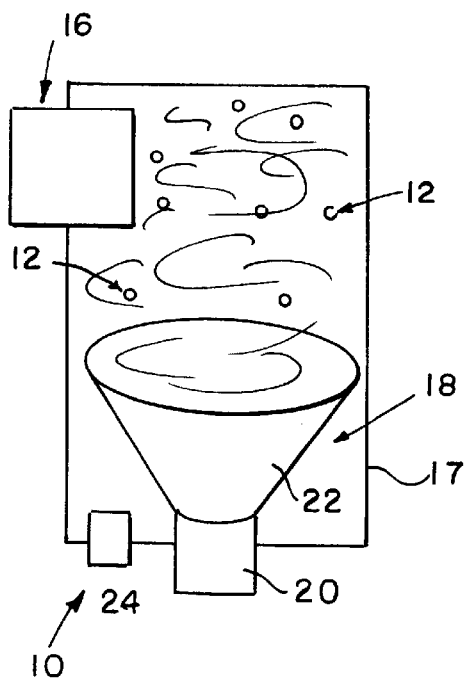
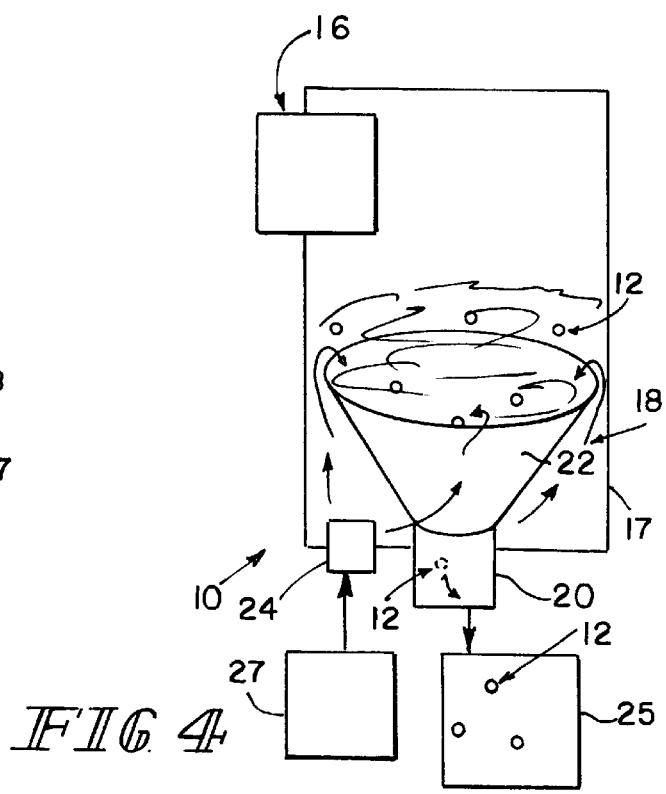
FIG. 3
FIG. 4

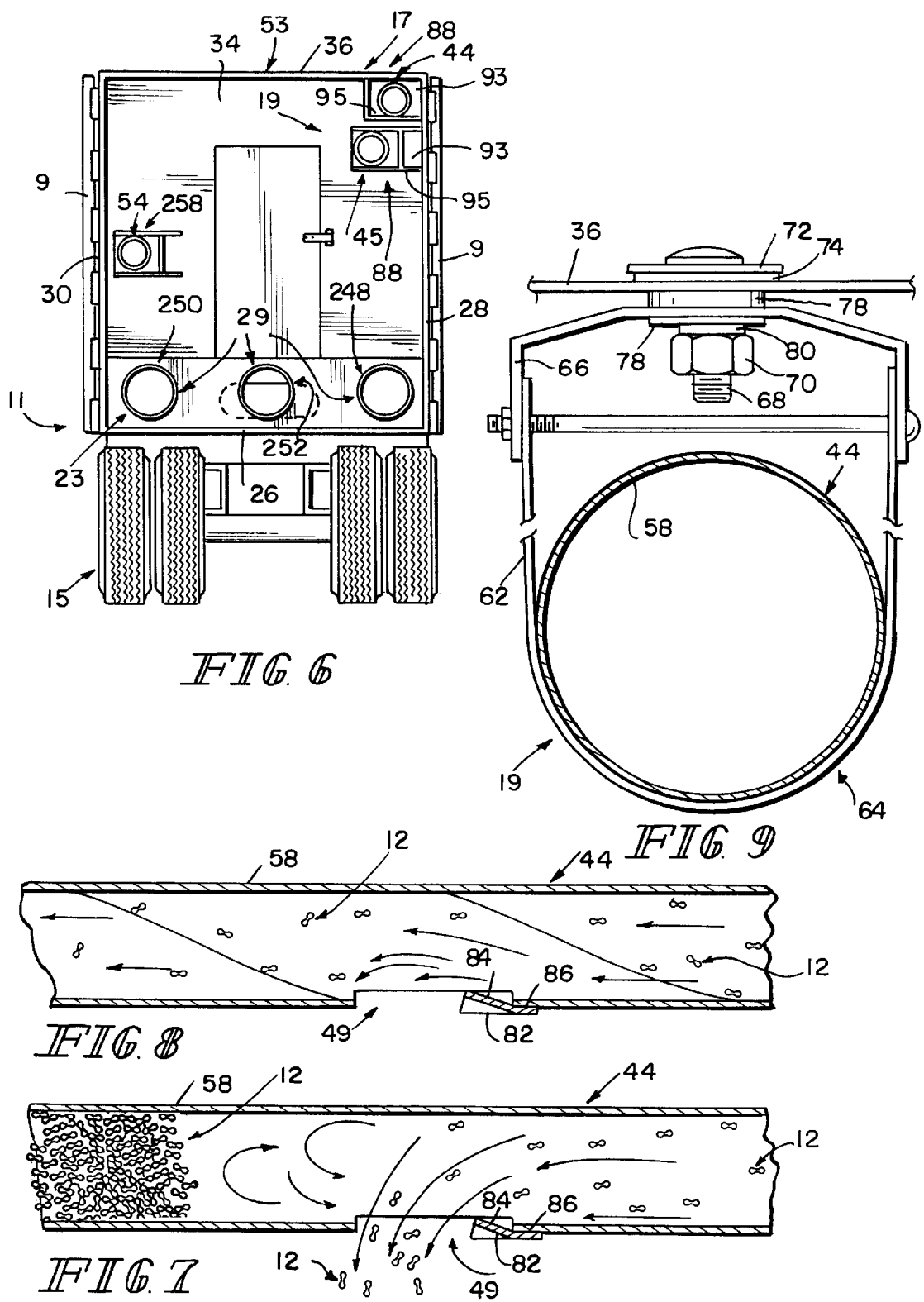

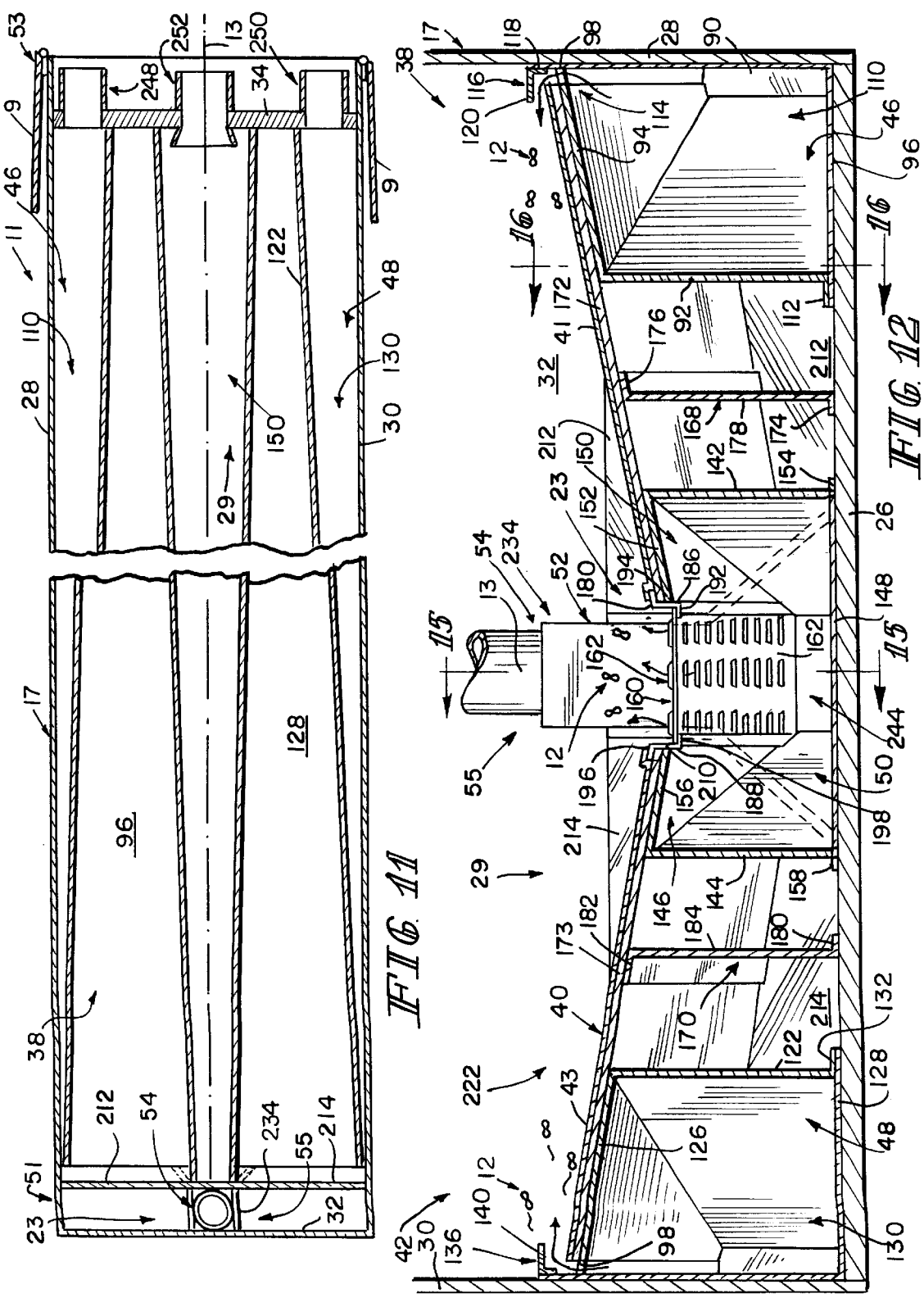

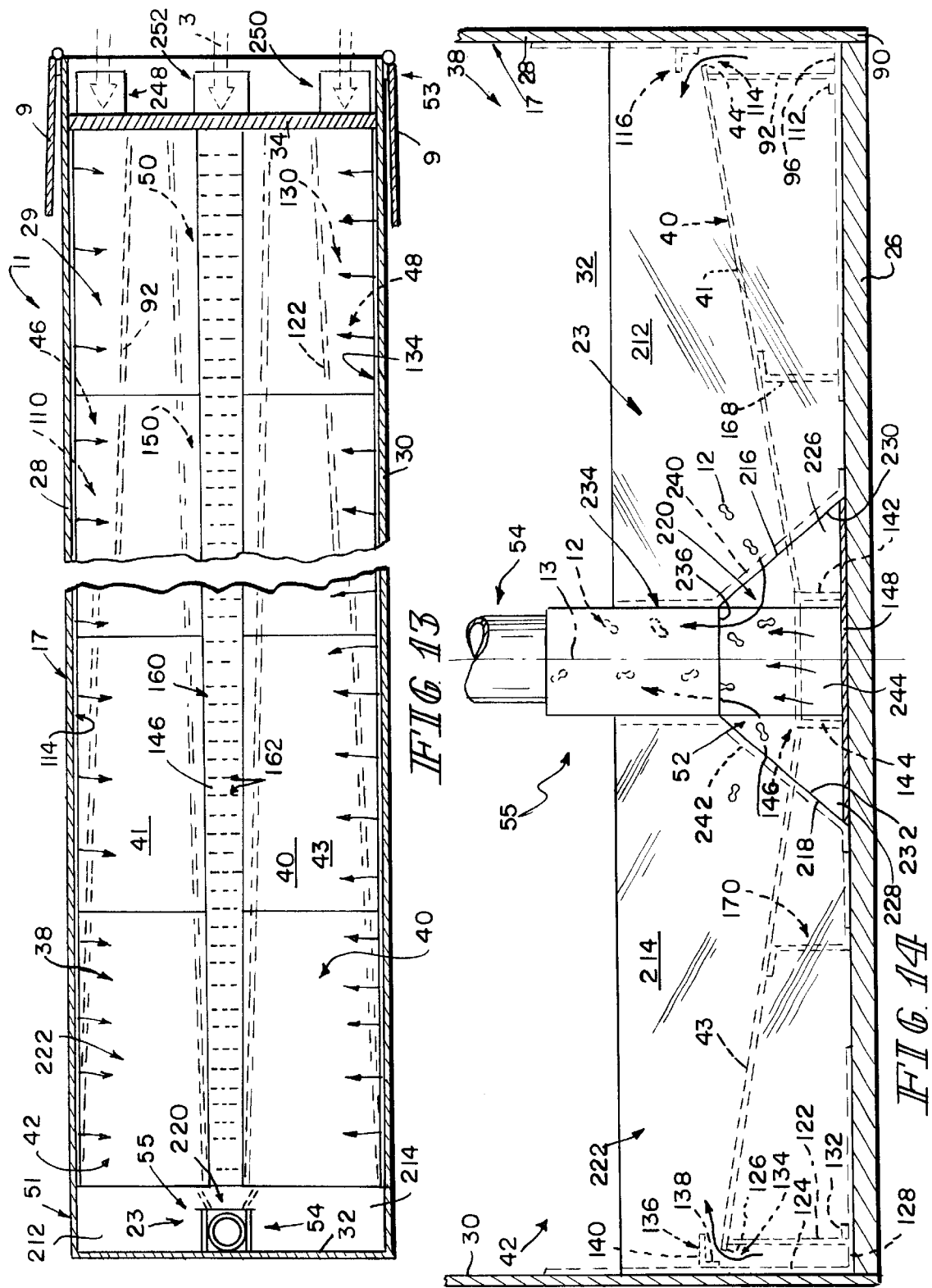

SYSTEM FOR LOADING AND UNLOADING POLYSTYRENE PELLETS INTO AND FROM A TRAILER

CROSS-REFERENCE TO RELATED APPLICATION

This application claims priority under 35 USC 119(e) based upon United States Provisional Application No. 60/156,822 filed on Sep. 30, 1999.

BACKGROUND AND SUMMARY OF THE INVENTION

The present invention relates to a trailer for hauling polystyrene pellets. More particularly, the present invention relates to a system for unloading polystyrene pellets from a semi-trailer.

Polystyrene pellets are commonly known as Styrofoam® brand packaging "peanuts." Polystyrene pellets are used as packing material to protect objects during shipping. Polystyrene pellets are loaded on bulk trailers at the polystyrene pellet manufacturing plant for shipment to a distribution center. The polystyrene pellets are then unloaded from the trailer to use as packing material in boxes or other containers used to ship fragile objects.

The current invention shows an apparatus for loading and unloading pellets into and from an interior region, such as a trailer, and a method for unloading pellets.

The unloading apparatus includes a collector within an interior region of the trailer, and adjacent one of a front or rear wall. Inflow conduits are positioned in the interior region and adjacent the side walls, with at least one opening that may be configured to direct flow toward a central longitudinal axis of the interior region. A blower is connected to the at least one input port, and a suction device connected to the output port during unloading to cause a flow of moving air so that pellets within the interior region are carried with the flow toward the central longitudinal axis and toward the collector and out the at least one output port.

The loading apparatus has pellet loading pipes with spaced openings configured along the pipe, and a deflection plate upstream of each of the openings to deflect pellets toward the outlet until a clog develops. When a clog develops, the pellets will then exit an upstream opening adjacent the clog until it clogs. This process will continue successively until the longitudinal spaced opening proximate the loading port becomes clogged and the chamber is substantially full.

The inventive method includes the steps of producing an air flow from the side walls toward the central longitudinal axis along the bottom. It also includes producing a second air flow along the central longitudinal axis towards the collector and removing pellets transported to the outlet port. The inventive method may also include providing a suction device in communication with a collector to urge pellets toward the outlet port. An airflow is created that carries pellets from the interior to the output port.

Other objects, advantages and novel features of the present invention will become apparent from the following detailed description of the invention when considered in conjunction with the accompanying drawings.

BRIEF DESCRIPTION OF THE DRAWINGS

FIG. 1 is a diagrammatic view of an empty trailer showing the trailer including a pellet-loading apparatus and a pellet-unloading apparatus;

FIG. 2 is a diagrammatic view similar to FIG. 1 showing the pellet-loading apparatus coupled to a pellet source at the pellet manufacturing facility and loading pellets into the trailer;

FIG. 3 is a diagrammatic view similar to FIG. 1 showing the trailer filled with pellets for transportation to a distribution center;

FIG. 4 is a diagrammatic view similar to FIG. 1 showing the pellet-unloading apparatus including an collector removing the pellets from the trailer, the collector including a pellet mover directing pellets toward the extraction device;

FIG. 6 is a rear view of the trailer of FIG. 5 showing the trailer including an access door, intake ports for the pair of loading pipes positioned in the upper-right corner of the back end of the trailer bed, three intake ports for a preferred pellet-unloading apparatus positioned near the bottom of the trailer bed, and an extraction port for the pellet-unloading apparatus positioned near the mid-point of the left side of the trailer bed;

FIG. 7 is a sectional view taken along line 7—7 of FIG. 5 showing pellets clogging an end of the upper loading pipe so that other pellets are forced to exit the upper loading pipe through a side opening;

FIG. 8 is a sectional view taken along line 8—8 of FIG. 5 showing the upper loading pipe including a deflector plate that diverts pellets traveling through the upper loading pipe and upstream opening;

FIG. 9 is a sectional view taken along line 9—9 of FIG. 5 showing a pipe hanger assembly supporting the upper loading pipe from the ceiling of the trailer;

FIG. 11 is a sectional view taken along line 11—11 of FIG. 10 showing the conduit system including right, left, and center conduits tapering from the back of the trailer to the front of the trailer;

FIG. 12 is a sectional view taken along line 12—12 of FIG. 10, with the majority of the pellets not shown for clarity, showing the right and left conduits directing pellets toward the center of the trailer and the center conduit directing pellets toward the scoop;

FIG. 13 is a sectional view taken along line 13—13 of FIG. 10, with the pellet removed for clarity, showing air blown from the right and left conduits flowing toward the center of the trailer and air blown from the center conduit flowing toward the scoop;

FIG. 14 is a sectional view taken along line 14—14 of FIG. 10, with the front end of the right, left, and center conduits shown in phantom, showing pellets being drawn into the scoop;

DETAILED DESCRIPTION OF THE PREFERRED EMBODIMENTS

Figure 5:
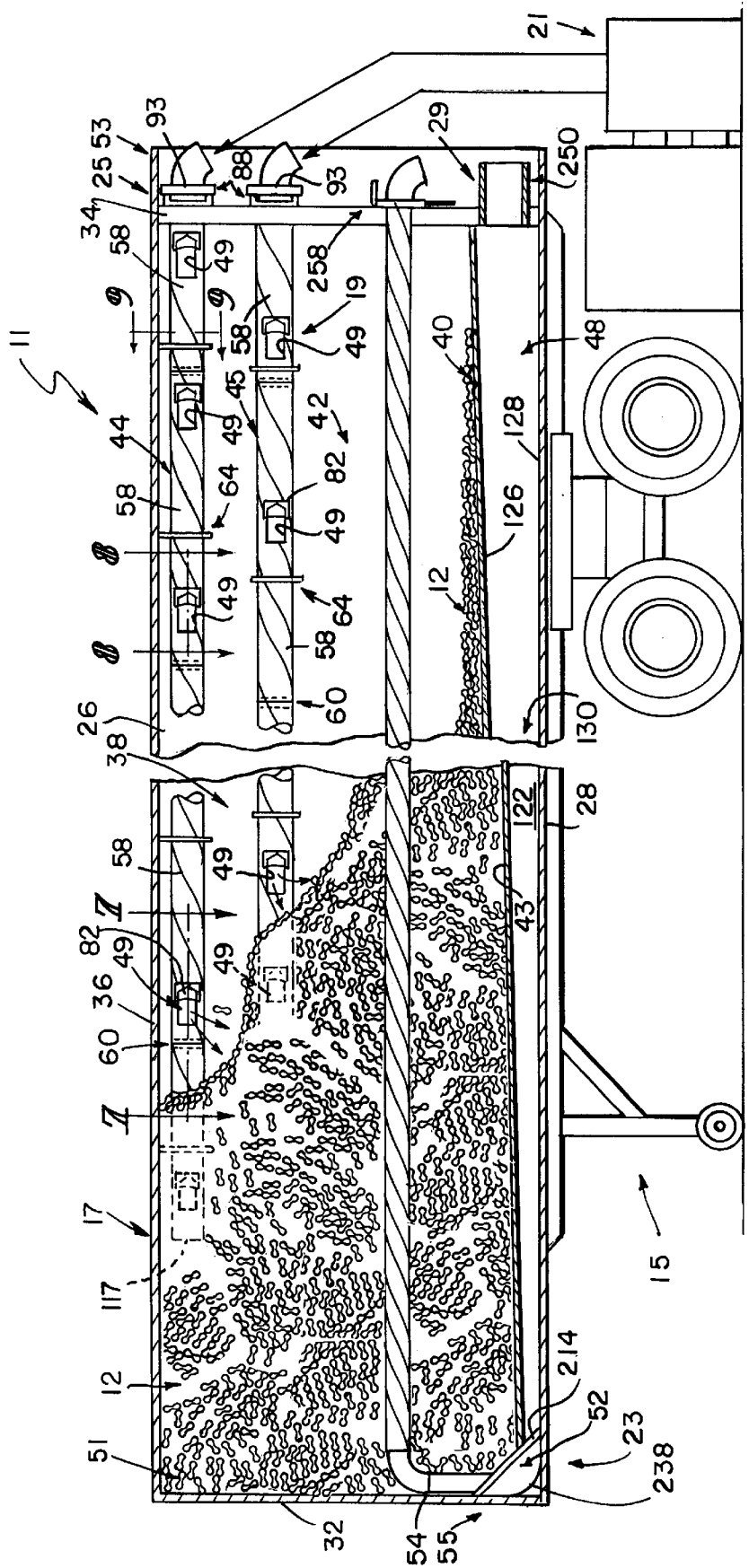
FIG. 5 is a cut-away side elevation view of a preferred embodiment trailer having a wheel assembly and a chamber being loaded with polystyrene pellets showing the trailer including a preferred pellet-loading apparatus including a pair of loading pipes loading polystyrene pellets into an interior region of the chamber.

A schematic trailer 10 according to the present disclosure is shown diagrammatically in FIG. 1 for hauling polystyrene pellets (commonly known as Styrofoam®-brand packaging peanuts) from a pellet manufacturing facility (not shown) to a distribution center (not shown) for use as packing material in packages shipped to customers. Pellets are made of expanded polystyrene and are extremely light having a density of approximately 0.2 pounds/cubic foot. Pellets are made in several shapes and sizes. For example, some pellets are made in flattened M-shapes, S-shapes, 8-shapes, and O-shapes. When moved relative to one another, pellets 12 can gain a static electric potential that cause pellets to "stick" together.

As shown in FIG. 2, schematic trailer 10 includes a chamber 17 and a pellet-loading apparatus 16 injecting pellets 12 from a supply 3 into chamber 17 from the manufacturing facility. Once schematic trailer 10 is loaded with pellets 12, as shown in FIG. 3, schematic trailer 10 is hauled to the distribution center by a semi-truck or other vehicle. As shown in FIG. 4, schematic trailer 10 also includes a pellet-unloading apparatus 18 that removes pellets 12 from chamber 17. Pellet-unloading apparatus 18 includes a pellet collector 20 that pulls pellets 12 from schematic trailer 10, the collector 20 in communication with a funneling device 22 that channels pellets 12 toward the collector 20. Pellet-unloading apparatus 18 also includes a pellet mover 24 that urges pellets 12 toward collector 20 by blowing air along the walls of funneling device 22.

The schematic diagrams of FIGS. 1–4 assist in laying the framework for the structure needed to accomplish the invention. For example, the schematic trailer 10 and funneling device 22, as shown in schematic FIGS. 1–4, is embodied by a trailer 11, a downward-slanted and V-Shaped floor 40 and plates 212,214, as shown more particularly in FIGS. 10–14. The collector 20, as shown in FIGS. 1–4, is embodied by a collector including scoop 52 and an extraction conduit 54, as shown in FIG. 5. The unloading apparatus 18 in FIGS. 1–4 is embodied in unloading apparatus 23 as shown in FIGS. 5 and 6. The pellet mover 24, as shown in FIGS. 1–4, is embodied in inflow conduits 46,48 and 50 as shown in FIGS. 11–14. The pellet loading apparatus 16, as shown in FIGS. 1–4, is embodied in the pellet loading apparatus 19 including the loading pipes 44,45, openings 49, and blower 21, as shown, for example, in FIG. 5.

A trailer 11 according to the presently preferred embodiment of the disclosure is shown in FIG. 5. Trailer 11 includes a wheel assembly 15 and a chamber 17 positioned on wheel assembly 15 for transportation. Trailer 11 further includes a pellet-loading apparatus 19 positioned within chamber 17. As shown in FIG. 5, a blower 21 (preferably rated at approximately 2,800 cubic feet per minute) at the manufacturing facility is coupled to pellet-loading apparatus 19 to blow pellets 12 through pellet-loading apparatus 19 into chamber 17. Pellet-loading apparatus 19 evenly distributes pellets 12 into chamber 17 until trailer 11 is filed with pellets 12. After loading, blower 21 is uncoupled from pellet-loading apparatus 19 and trailer 11 is hauled by a semi-truck or other vehicle to a shipping facility to be unloaded. Trailer 11 also includes a pair trailer doors 9 that are closed to a back end 34 of chamber 17 during hauling.

Figure 10:
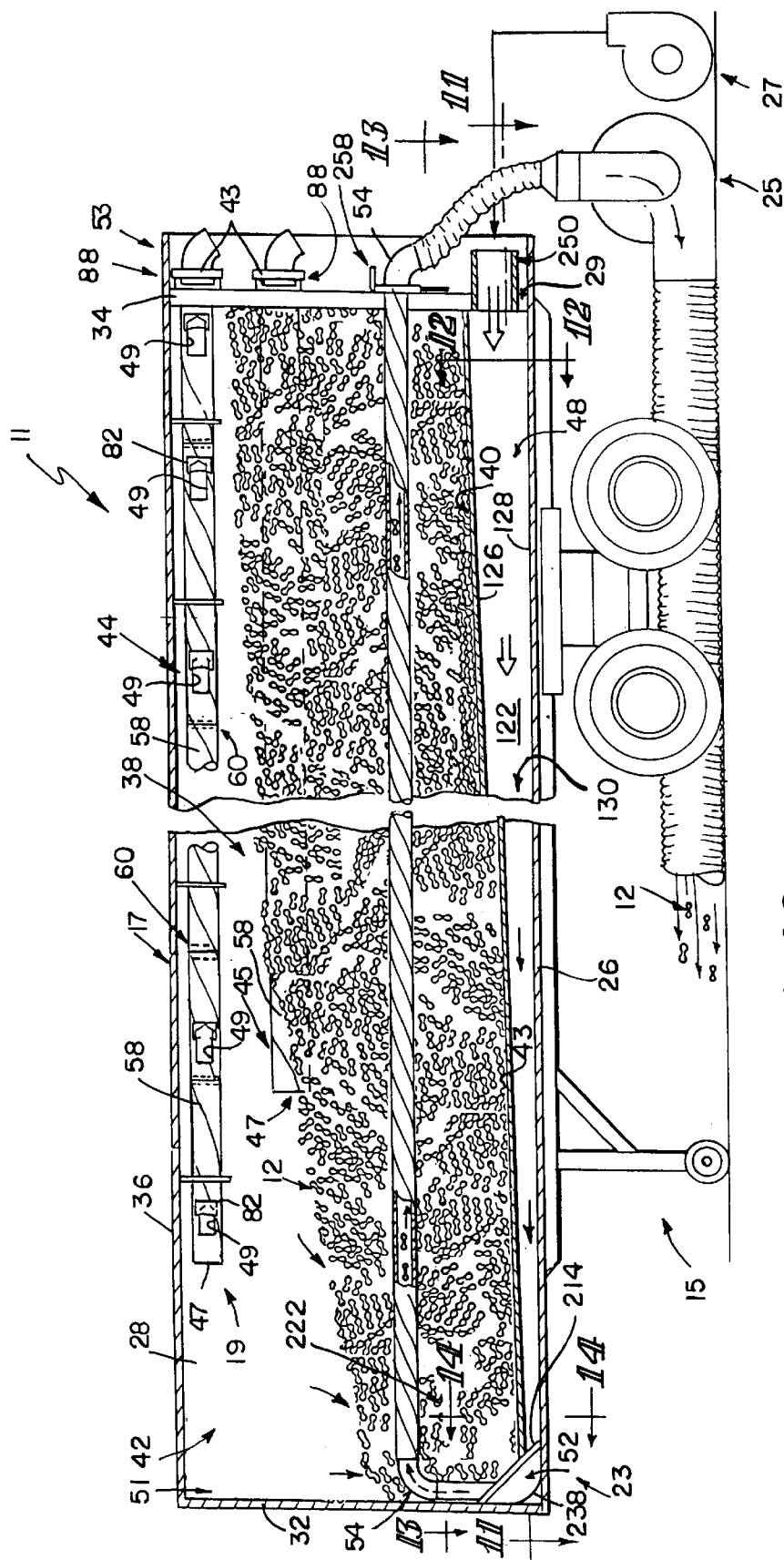
FIG. 10 is a cut-away side elevation view of the trailer showing pellets being unloaded from the trailer by the preferred pellet-unloading apparatus including an extraction conduit pulling the pellets from the trailer, a scoop positioned at the front-bottom of the chamber and directing the pellets into the extraction pipe, and a downwardly sloping conduit system directing the pellets toward the scoop.

As shown in FIG. 10, trailer 11 further includes a pellet-unloading apparatus 23 positioned within chamber 17 to unload pellets 12 from trailer 11. To unload pellets 12 from trailer 11, a suction device 25 (preferably rated at 15 horsepower and approximately 2,800 cubic feet/minute) and a blower 27 (preferably rated at 15 horsepower and approximately 2,800 cubic feet/minute) located at the shipping facility are coupled to pellet-unloading apparatus 23 to extract pellets 12 from chamber 17. After unloading, suction device 25 and blower 27 are uncoupled from pellet-unloading apparatus 23 and trailer 11 is hauled back to the manufacturing facility to be reloaded with pellets 12 for the next shipment.

Trailer chamber 17 is commercially available having dimensions of 48' long, 102" wide, and 114" tall. Other size chambers may also be used in accordance with the present disclosure. Chamber 17 includes a chamber bottom 26, a right side wall 28, a left side wall 30 coupled, a front end wall 32, a back end wall 34, and a ceiling 36. Chamber bottom 26, right and left side walls 28, 30, front and back end walls 32, 34, and ceiling 36 cooperate to define an interior region 38 of chamber 17.

Pellet-unloading apparatus 23 includes a V-shaped floor 40 positioned in interior region 38 as shown in FIG. 12. Floor 40 cooperates with right and left side walls 28, 30, front and back end walls 32, 34 and ceiling 36 to define a pellet storage region 42 to store pellets 12 during transportation from the manufacturing facility to the distribution center. Pellets 12 are loading into storage region 42 by pellet-loading apparatus 19 and removed from storage region 42 by pellet-unloading apparatus 23.

Pellet-loading apparatus 19 includes first and second loading pipes 44,45 (preferably 10 inches in diameter) that are coupled to blower 21 to move pellets 12 from the manufacturing facility to storage region 42. Loading pipes 44, 45 include opened front ends 47 and a plurality of openings 49 through which pellets 12 empty from pipes 44, 45 into storage region 42. The openings 49 are shown in sides of the loading pipes 44, 45. When storage region 42 is filled with pellets 12, blower 21 is shut down and uncoupled from loading pipes 44, 45 so that trailer 11 can be hauled to distribution facility.

Loading pipes 44,45 include a plurality of pipe sections 58 and a plurality of pipe couplers 60 coupling respective pipe sections 58 together as shown in FIG. 5. Fasteners couple pipe couplers 60 to each respective pipe section 58 to form pipes 44, 45. According to the preferred embodiment of the present disclosure, pipe sections 58 are spiral formed. Spiral formed pipes provide added strength to pipes 44, 45. However, other configurations of pipes and pipe sections may also be used.

As shown in FIG. 9, pellet-loading apparatus 19 further includes pipe hanger assemblies 64 coupled to ceiling 36 to hang pipe 44 in interior region 38 of chamber 17. Although pipe 44 is shown to hang from ceiling 36 by hanger assemblies 64, it is also within the scope of the disclosure to support pipe 44 using hanger assemblies 64 coupled to right side wall 28. Each pipe hanger assembly 64 includes a strap 62 and bracket 66 for supporting each respective pipe section 58, a bolt 68 extending through the top end of bracket 66, and a nut 70 coupled to bolt 68 to secure bracket 66 to bolt 68. Each pipe hanger assembly 64 further includes a first flat washer 72 positioned under the head of bolt 68 and a RTV gasket 74 positioned between the head of bolt 68 and ceiling 36. Gasket 74 provides a seal over the aperture formed in ceiling 36 to prevent rain water or other liquids from entering into trailer 11. Each pipe hanger assembly 64 also includes a stepped washer 76 positioned between bracket 66 and ceiling 36, a second flat washer 78 positioned between nut 70 and bracket 66, and a lock washer 80 positioned between second flat washer 78 and bracket 66.

Nut 70 is turned onto bolt 68 to compress the other components of pipe hanger assembly 64 together and compress gasket 74 into sealing engagement with ceiling 36. Each washer is made of aluminum to prevent corrosion. However, the washers may also be made of other suitable materials. Pipe hangers 64 for pipe 45 are coupled to right side wall 28 to hang pipe 45 in chamber 17.

Pellet-loading apparatus 19 further includes a plurality of deflection plates 82 coupled to pipe sections 58 over a portion of respective openings 49. As shown in FIG. 7, each deflection plate 82 includes a bent portion 84 and a flange portion 86 coupled to pipe section 58 and bent portion 84. Bent portion 84 is positioned within pipe section 58. Flange portion 86 is coupled to pipe section 58 by fasteners.

During loading of trailer 11, pellets 12 travel toward open front end 47 of respective pipes 44, 45. Because bent portions 84 of each deflection plate 82 extends into each respective pipe section 58, pellets 12 are initially deflected over each respective opening 49 until exiting through open front end 47 into storage region 42. As pellets 12 exit from open front end 47 of pipes 44, 45, front end 51 of trailer 11 fills with pellets 12. As front end 51 continues to fill, pellets 12 eventually cover open front ends 47 of pipes 44, 45 so that addition pellets 12 are block from exiting therethrough. Pellets 12 are then forced from the forward most openings 49 of pipes 44, 45 until covered by pellets 12. As each respective opening 49 of pipes 44, 45 is covered, pellets 12 begin to exit through the next upstream opening 49 until storage region 42 is substantially full of pellets 12. By positioning the backward most opening 49 of pipe 44 adjacent back end wall 34, the top-back portion of storage region 42 is filled with pellets 12 to substantially fill trailer 11 with pellets 12.

As shown in FIG. 6, pellet-loading apparatus 19 further includes two gate assemblies 88 coupled to respective first and second pipes 44,45 to close an open back end 90 of pipes 44, 45 after trailer 11 is loaded. Each gate assembly 88 includes a gate plate 93 and a track 95 for receiving gate plate 93. The backward most pipe section 58 of each pipe 44, 45 includes a slot (not shown) for receiving gate plate 93. Each gate plate 93 slides sideways in a slot from a first position blocking back end 90 of each pipe 44, 45 to a second position opening back end 90 for receiving pellets 12.

At the distribution center, pellet-unloading apparatus 23 is used to unload pellets 12 from trailer 11 to a storage region (not shown) in the shipping facility. Pellet-unloading apparatus 23 includes a pellet mover 24 or conduit system 29, funnel 22, a collector 20 including a scoop 52 positioned at a front end 51 of trailer 11, and an extraction conduit 54 (preferably 8 inches in diameter) coupled to scoop 52. Scoop 52 is apart of presently preferred collector, as shown in FIG. 10, that operates in cooperation with extraction conduit 54. Suction device 25 is coupled to extraction conduit 54 at a back end 53 of trailer 11 and blower 27 is coupled to conduit system 29 at back end 53.

Blower 27 pumps air into conduit system 29 to urge pellets 12 down V-shaped floor 40 toward scoop 52. Suction device 25 generates negative pressure in extraction conduit 54 to pull pellets 12 into scoop 52 and extraction conduit 54 to remove pellets 12 from trailer 11. Thus, suction device 25 draws pellets 12 from storage region 42 through scoop 52 and extraction conduit 54 to the storage region (not shown) in the distribution center to unload trailer 11.

As shown in FIG. 12, conduit system 29 includes right and left conduits 46, 48 and a center conduit 50 positioned between right and left conduits 46, 48. Right and left conduits 46, 48 are positioned adjacent to respective right and left side walls 28,30 of chamber 17 to direct pellets 12 toward a longitudinal, center axis 13 of chamber 17. Center conduit 50 is positioned to direct pellets toward scoop 52.

Right conduit 46 includes right, left, top, and bottom walls 90, 92, 94, 96 extending from back end 53 of trailer 11 toward front end 51 that define an air passage 110 extending through right conduit 46. As shown in FIG. 12, left wall 92 and top wall 94 are formed from a single piece of sheet metal. Left wall 92 includes a flange 112 coupled to bottom wall 96 to couple left wall 92 to bottom wall 96. Right wall 90 and bottom wall 96 are also formed from a single piece of sheet metal. Right wall 90 is coupled to right side wall 28 with fasteners (not shown). Top wall 94 is spaced apart from right wall 90 by approximately one half inch by a spacer 98 to provide an air gap 114 therebetween. According to alternative embodiments of the right conduit, other materials and configurations are used to define an air passage and air gap.

As shown in FIGS. 12 and 13, air is forced through air gap 114 to direct pellets 12 toward center axis 13 of chamber 17. Blower 27 blows air into a port 248 (preferably 14 inches in diameter) of right conduit 46 from back end 53 of trailer 11 to create positive pressure in air passage 110. The positive air pressure forces the air down right conduit 46 so that air escapes to the lower pressure region provided in storage region 42.

Right conduit 46 is configured to provide a substantially equal pressure drop between air passage 110 and storage region 42 along the length of air gap 114. To maintain the pressure drop, top wall 94 and left wall 92 are configured to provide right conduit 46 with a decreasing flow area as right conduit 46 extends toward front end 51 of trailer 11. As illustrated in FIGS. 11 and 12, the width of top wall 94 decreases as right conduit 46 extends toward front end 51 of trailer 11. Similarly, the height of left wall 92 decreases as right conduit 46 extends toward front end 51. The combination of the decrease height of left wall 92 and decreasing width of top wall 94 provides the decreasing flow area of air passage 10 to maintain the pressure drop along right conduit 46.

Conduit system 29 further includes a right louver 116 positioned to direct air exiting right conduit 46 down right side 41 of V-shaped floor 40. Right louver 116 includes a mounting flange 118 coupled to right wall 90 of right conduit 46 and an air diverter flange 120 coupled to mounting flange 118. Diverter flange 120 directs air leaving right conduit 46 through air gap 114 along right side 41 of V-shaped floor 40 so that pellets 12 are urged from the right side of chamber 17 toward center axis 13 of chamber 17.

Left conduit 48 includes right, left, top, and bottom walls 122, 124, 126, 128 extending from back end 53 of trailer 11 toward front end 51 that define an air passage 130 extending through left conduit 48. As shown in FIG. 12, right wall 122 and top wall 126 are formed from a single piece of sheet metal. Right wall 122 includes a flange 132 coupled to bottom wall 128 to couple right wall 122 to bottom wall 128. Left wall 124 and bottom wall 128 are also formed from a single piece of sheet metal. Left wall 124 is coupled to left side wall 30 with fasteners (not shown). Top wall 126 is spaced apart from left wall 124 by approximately one half inch by a spacer 98 to provide an air gap 134 therebetween. According to alternative embodiments of the left conduit, other materials and configurations are used to define an air passage and air gap.

As shown in FIGS. 12 and 13, air is forced through air gap 134 to direct pellets 12 toward center axis 13 of chamber 17. Blower 27 blows into a port 250 (preferably 14 inches in diameter) of left conduit 48 from back end 53 of trailer 11 to create positive pressure in air passage 130. The positive air pressure forces the air down left conduit 48 so that the air escapes to the lower pressure region provided in storage region 42.

Left conduit 48 is configured to provide a substantially equal pressure drop between air passage 130 and storage region 42 along the length of air gap 134. To maintain the pressure drop, top wall 126 and right wall 122 are configured to provide left conduit 48 with a decreasing flow area as left conduit 48 extends toward front end 51 of trailer 11. As illustrated in FIGS. 11 and 12, the width of top wall 126 decreases as left conduit 48 extends toward front end 51 of trailer 11. Similarly, the height of right wall 122 decreases as left wall 48 extends toward front end 51. The combination of the decrease height of right wall 122 and decreasing width of top wall 126 provides the decreasing flow area of air passage 130 to maintain the pressure drop along left conduit 48.

Conduit system 29 further includes a left louver 136 positioned to direct air exiting left conduit 48 down left side 43 of V-shaped floor 40. Left louver 136 includes a mounting flange 138 coupled to left wall 124 of left conduit 48 and an air diverter flange 140 coupled to mounting flange 138. Diverter flange 140 directs air leaving left conduit 48 through air gap 134 along left side 43 of V-shaped floor 40 so that pellets 12 are urged from the left side of chamber 17 toward center axis 13 of chamber 17.

Center conduit 50 includes right, left, top, and bottom walls 142, 144, 146, 148 extending from back end 53 of trailer 11 toward front end 51 that define an air passage 150 extending through left conduit 48. As shown in FIG. 12, right wall 142 and a right portion 152 of top wall 146 are formed from a single piece of sheet metal. Right wall 142 includes a flange 154 coupling right wall 142 to chamber bottom 26. Left wall 144 and a left portion 156 of top wall 146 are also formed from a single piece of sheet metal. Left wall 144 includes a flange 158 coupling left wall 144 to chamber bottom 26. As shown in FIG. 12, bottom wall 148 is made of sheet metal and coupled to chamber bottom 26. Top wall 146 further includes a center louver 160 positioned between right and left portions 152, 156 of top wall 146. Center louver 160 is made of sheet metal and formed to include a plurality of openings 162. According to alternative embodiments of the center conduit, other materials and configurations are used to define an air passage.

As shown in FIGS. 8 and 13, air is forced through openings 162 to direct pellets 12 toward front end 51 of chamber 17 and scoop 52. Air is blown into a port 252 (preferably 14 inches in diameter at the inlet and tapering to a 9.5 inch×24 inch oval at the outlet) of center conduit 50 from back end 53 of trailer 11 to create positive pressure in air passage 150. The positive air pressure forces the air down center conduit 50 so that the air escapes through openings 162 to the lower pressure region provided in storage region 42 and urges pellets 12 toward scoop 52.

Center conduit 50 is configured to provide a substantially equal pressure drop between air passage 150 and storage region 42 along the length of center louver 160. To maintain the pressure drop, top wall 146, right wall 142, and left wall 144 are configured to provide center conduit 50 with a decreasing flow area as center conduit 50 extends toward front end 51 of trailer 11. As illustrated in FIGS. 11 and 12, the width of top wall 146 decreases as center conduit 50 extends toward front end 51 of trailer 11. Similarly, the height of right and left walls 142, 144 decrease as center conduit 50 extends toward front end 51. The combination of the decrease height of right and left walls 142, 144 and decreasing width of top wall 146 provides the decreasing flow area of air passage 150 to maintain the pressure drop along left conduit 48.

As shown in FIGS. 10 and 12, V-shaped floor 40 funnels pellets 12 from the right and left sides of chamber 17 toward center louver 160 and from back end 53 of trailer 11 to front end 51. Floor 40 is made of sections of sheet metal and includes right and left sides 41, 43 that provide the V-shaped configuration. As shown in FIG. 12, right side 41 slants (preferably at 10°) downwardly (from right to left) toward center louver 160. Similarly, left side 43 slants (preferably at 10°) downwardly (from left to right) toward center louver 160. A vertex of sides 41 and 43 is depicted by center axis 13. As shown in FIGS. 10 and 12, right and left side 41, 43 of floor 40 and center louver 160 slant (preferably at 1.2°) downwardly (from back to front) toward scoop 52. The slanting of floor 40 and center louver 160 and the air escaping conduit system 29 direct pellets 12 toward the rear-center of chamber 17 so that scoop 52 collects pellets 12 and extraction conduit 54 pulls pellets 12 from chamber 17. As shown in FIG. 12, floor 40 is supported above bottom 26 by conduit system 29, a right bracket 168, a left bracket 170, and a plurality of right and left strips 172, 173. Right bracket 168 is positioned between right conduit 46 and center conduit 50 to support right strips 172 extending therebetween and left bracket 170 is positioned between left conduit 48 and center conduit 50 to support left strips 173 therebetween. Right and left brackets 168, 170 extend from back end 53 of trailer 11 toward front end 51 to support strips 172, 173 positioned along the length of trailer 11.

Right bracket 168 is made of sheet metal and includes a lower mounting flange 174 coupled to chamber bottom 26, an upper mounting flange 176 coupled to support strips 172, and a web 178 coupled to and extending between upper and lower mounting flanges 174, 176 as shown in FIG. 12. Upper mounting flange 176 is slanted to support strips 172 at 10°. Similarly, left bracket 170 is made of sheet metal and includes a lower mounting flange 180 coupled to chamber bottom 26, an upper mounting flange 182 coupled to support strips 172, and a web 184 coupled to and extending between upper and lower mounting flanges 180, 182. Upper mounting flange 176 is slanted to support strips 172 at 10°.

Strips 172, 173 are made of steel and provide rigidity to floor 40 to prevent buckling. Right strips 172 extend from the right-most extent of top wall 92 of right conduit 46 to the left-most extent of right portion 152 of top wall 146 of center conduit 50. Similarly, left strips 173 extend from the left-most extent of top wall 126 of left conduit 48 to the right most extent of left portion 156 of center conduit 50. Right strips 172 are spaced apart laterally along the length of trailer 11 by a distance of approximately one foot to support the right side 41 of floor 40 along the length of trailer 11.

Figure 16:
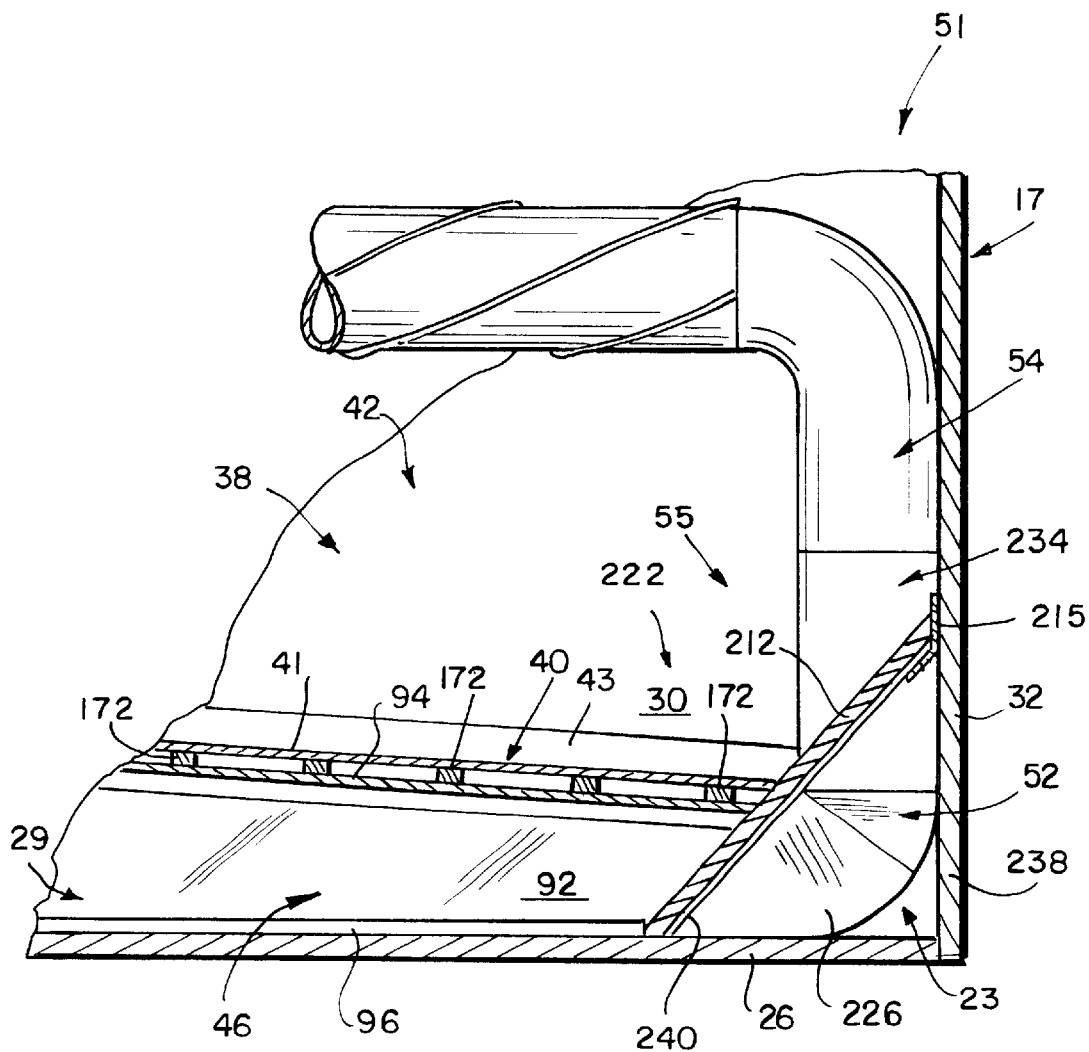
FIG. 16 is a section view taken along line 16—16 of FIG. 12.

(See FIG. 16.) Similarly, left strips 173 are spaced apart laterally along the length of trailer 11 by a distance of approximately one foot to support the left side 43 of floor 40. Each strip 172, 173 is fastened to respective right, left, and central conduits 46, 48, 50 and right and left brackets 168, 170 and right and left sides 41, 43 of floor 40 are fastened to respective strips 172, 173 to provide the structural support for floor 40.

As shown in FIG. 12, conduit system 29 further includes right and left brackets 186, 188 for supporting center louver 160. Right bracket 186 is made of sheet metal and includes a mounting flange 190 sandwiched between the right portion of floor 40 and right strips 172, a support flange 192 supporting a right side of center louver 160, and a web 194 extending between mounting flange 190 and support flange 192. Similarly, left bracket 188 is made of sheet metal and includes a mounting flange 196 sandwiched between the left portion of floor 40 and left strips 173, a support flange 198 supporting a left side of center louver 160, and a web 210 extending between mounting flange 196 and support flange 198. Each bracket 186, 188 extends from back end 53 of trailer 11 toward front end 51 to support the length of center louver 160.

As shown in FIGS. 14 and 16, trailer 11 includes a right plate 212 and a left plate 214 that cooperate with V-shaped floor 40 to define a preferred funnel 222 that directs pellets 12 toward an opening 220 in scoop 52. Right and left plates 212, 214 slant (preferably at 45°) from the front end 51 of trailer 11 toward bottom 26 to direct pellets 12 away from front end wall 32 of trailer 11 and toward opening 220 in scoop 52. Right and left plates 212, 214 are made of sheet metal and are coupled to front end wall 32 by a bracket 215 as shown in FIG. 16.

As shown in FIGS. 11 and 16, right plate 212 closes the front end of right conduit 46 so that air does not move therethrough from air passage 110. Similarly, left plate 214 closes the front end of left conduit 48 so that air does not move therethrough from air passage 130. As shown in FIG. 14, right and left plates 212, 214 are substantially rectangular with truncated corners 216, 218.

Figure 15:
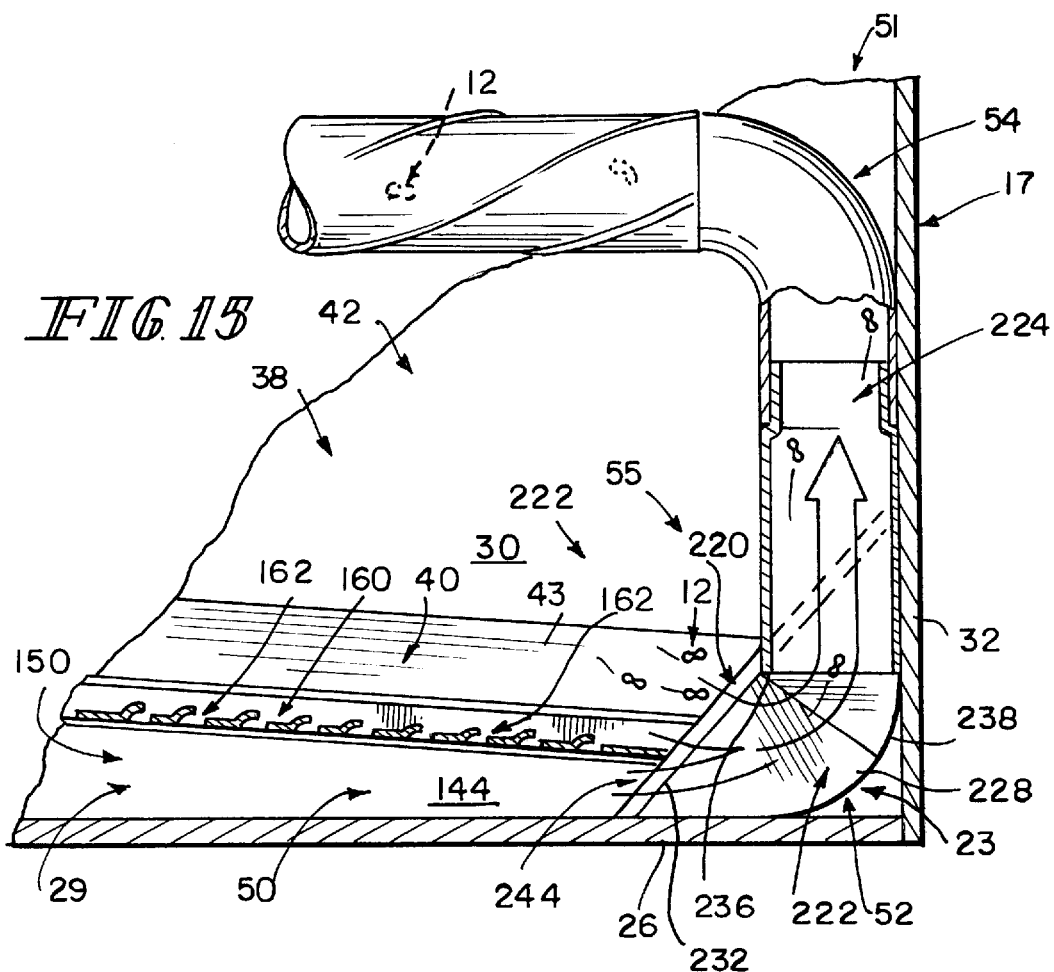
FIG. 15 is a sectional view taken along line 15—15 of FIG. 12 showing the center conduit directing pellets into the scoop and the scoop directing pellets into the extraction conduit to remove pellets from the trailer.

Scoop 52 is funnel-shaped having a first end or wide opening 220, a tapered passage 222, and a narrow end or narrow opening 224 exiting into extraction conduit 54. Scoop 52 further includes a pair of triangular side walls 226, 228 having edges 230, 232 and a square collar 234 having an edge 236. Edges 230, 232, 236 cooperate to define opening 220. Side walls 226, 228 taper to narrow passage 222 as scoop 52 extends from wide opening 220 to narrow opening 224. As shown in FIG. 15, scoop 52 further includes a rounded back wall 238 that provides a smooth transition as pellets 12 are directed through scoop 52.

As shown in FIGS. 14 and 16, right and left plates 212, 214 are coupled to scoop 52. Scoop 52 includes a pair of flanges 240, 242 that extend along edges 230, 232 and the right and left sides of collar 234. Right plate 212 is coupled to flange 240 and left plate 214 is coupled to flange 242.

As shown in FIGS. 14, 15, pellets 12 are funneled toward opening 220 and are pulled into scoop 52 by suction applied to extraction conduit 54 by suction device 25. The front end of center conduit 50 has an opening 244 through which a portion of the air flowing through air passage 150 exits and enters scoop 52. This flow of air from opening 244 blows pellets 12 into scoop 52 and extraction conduit 54. Thus, pellets 12 are both pulled into scoop 52 by the suction applied to extraction conduit 54 and blown into scoop 52 by air exiting opening 244 from air passage 150.

Extraction conduit 54 extends from the back-center of trailer 11 at scoop 52 to the left-back of trailer 11 at port 256. A gate 258 is located at port 256 to close the back end of extraction conduit 54 during transportation of trailer 11 between the manufacturing facility and the distribution center, as shown in FIG. 6.

To unload trailer 11, blower 27 is coupled to ports 248, 250, 252 of right, left, and center conduits 46, 48, 50 and suction device 25 is coupled to port 256 of extraction conduit 54. After blower 27 and suction device 25 are activated, air flows into right, left, and center conduits 46, 48, 50 and passes through respective air passages 110, 130, 150. As shown in FIGS. 12 and 14, pressurized air in air passage 110 exits through air gap 114 to direct pellets down right side 41 of floor 40 toward center louver 160; pressurized air in air passage 130 exits through air gap 134 to direct pellets down left side 43 of floor 40 toward center louver 160; and pressurized air in air passage 150 exits openings 162 in center louver 160 to direct pellets 12 collecting at the center of floor 40 toward front end 51 of trailer 11 and scoop 52. Additional air from air passage 150 of center conduit 50 exits through opening 244 to blow pellets 12 into scoop 52.

Suction device 25 creates negative pressure in extraction conduit 54 to draw air and pellets 12 into scoop 52. As pellets 12 collect near opening 220 of scoop 52, the negative pressure in extraction conduit 54 draws pellets 12 into scoop 52 and extraction conduit 54. Pellets 12 are then pulled through extraction conduit 54 and exit through port 256 and into suction device 25. Pellets 12 are then dumped into a storage area (not shown) at the shipping facility for use as packing material. When trailer 11 is unloaded, suction device 25 and blower 27 are uncoupled from respective ports 248, 250, 252, 256 and trailer 11 is hauled back to the pellet manufacturing facility for reloading.

Figure 17:
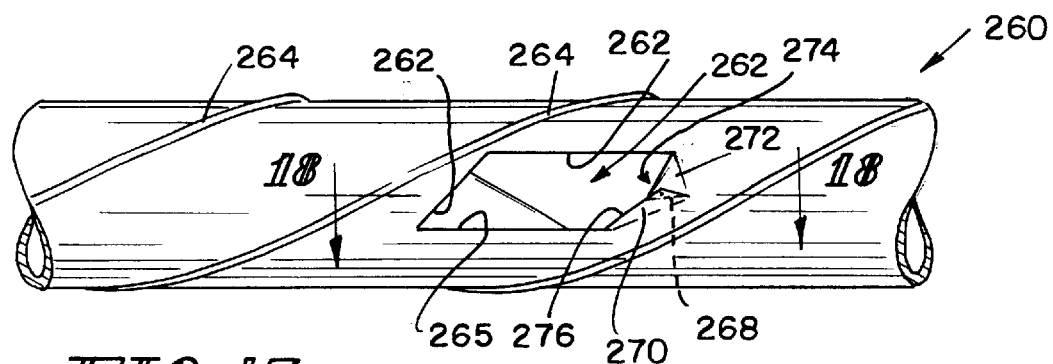
FIG. 17 is a side elevation view of an alternative embodiment loading pipe.
Figure 18:
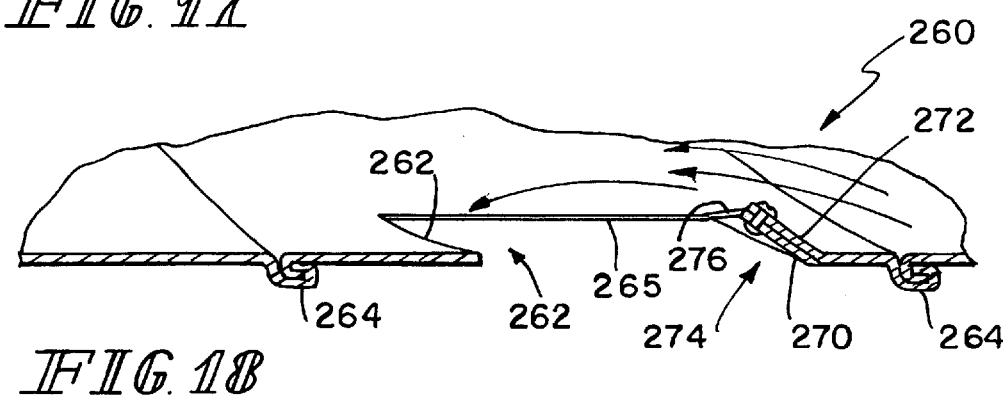
FIG. 18 is a sectional view taken along line 18—18 of FIG. 17 showing the loading pipe including a deflector that diverts pellets traveling through the loading pipe over the opening.

An alternative embodiment loading pipe 260 is shown in FIGS. 17 and 18. Openings 262 are formed in pipe 260 to permit pellets 12 to exit loading pipe 260. Openings 262 are formed in pipe 260 without cutting through a rib 264 in spiral pipe 260 so that the structural integrity of pipe 260 is not significantly affected. Pipe 260 includes a first edge 262 that is substantially parallel to rib 264 and parallel second and third edges 265, 266. A slit 268 is cut in pipe 260 to form two flaps 270, 272 that arc folding into pipe 260 and fastened together to form a deflection plate 274 and define a fourth edge 276. First, second, third, and fourth edges 262, 264, 266, and 268 cooperate to define opening 262.

Thus, a trailer is provided to haul packing material. The trailer includes a chamber having an interior region and an unloading system. The unloading system includes a collector positioned to remove the packing material from the trailer, an inlet, and an outlet. The unloading system further includes a funnel positioned to direct packing material toward the inlet of the collector and a conduit system configured to blow air down the funnel to direct the packing material into the inlet of the collector.

According to a preferred embodiment, a trailer and packing material are further provided. The packing material has a density of approximately 0.2 pounds/cubic foot. The trailer includes a chamber having an interior and an unloading system. The unloading system includes a collector positioned to remove the packing material from trailer. The unloading system further includes an inlet and an outlet and a funnel positioned to direct the packing material toward the inlet of the collector.

In preferred embodiments, the unloading system of the trailer and packing material further includes a conduit system configured to blow air down the funnel to direct the packing material into the inlet of the collector. The chamber of the trailer includes a slanted floor defining a portion of the funnel. The conduit system includes a first portion positioned near a bottom edge of the slanted floor to urge the packing material toward the inlet of the collector. The conduit system further includes a second portion positioned near a top edge of the slanted floor to urge packing material down the slanted floor.

Although the present invention has been described and illustrated in detail, it is to be clearly understood that the same is by way of illustration and example only, and is not to be taken by way of limitation. The chamber is shown as part of a trailer having wheels, but the chamber could also be a closed chamber on a flatbed truck or trailer. The spirit and scope of the present invention are to be limited only by the terms of the appended claims.

We claim:

1. An apparatus for loading and unloading pellets into a trailer with an interior region having a length, width and height defined by a bottom and ceiling, as well as front, back, left and right walls, the apparatus comprising:
   a trailer, said trailer comprising
   a collector positioned within the interior region, and adjacent one of a front or rear wall,
   an output port connected to the collector,
   longitudinally extending inflow conduits positioned in the interior region and adjacent the right and left side walls,
   at least one opening on each inflow conduit and configured to direct flow toward a central longitudinal axis of the interior region,
   at least one input port in fluid communication with each inflow conduit; and
   a blower connected to the at least one input port and a suction device connected to the output port during unloading to cause a flow of moving air so that pellets within the interior region are carried with the flow toward the central longitudinal axis and toward the collector and out the output port.

2. The apparatus as in claim 1, further comprising a center input conduit positioned along the central longitudinal axis and having openings configured to direct flow longitudinally toward the collector.

3. The apparatus as in claim 1, further comprising a floor, at least a portion of which is spaced from the bottom, and the input conduits are between the bottom and the floor.

4. The apparatus as in claim 1, further comprising a floor, at least a portion of which is displaced from the bottom, and which slants lengthwise toward the bottom in order to direct pellets toward the collector.

5. The apparatus as in claim 1, wherein the conduits have diminishing cross-sectional area, at planes transverse to longitudinal axes thereof, at increasing distance from the input port, in order to equalize flow velocity from the openings at diverse locations along the inflow conduits.

6. The apparatus as in claim 1, wherein the floor slants lengthwise with respect to the bottom in order to direct flow downward toward the collector.

7. The apparatus as in claim 1, further comprising an extraction conduit connecting the collector to the output port.

8. The apparatus as in claim 1, further comprising a floor that forms a general V-Shape with a vertex along the central longitudinal axis.

9. The apparatus as in claim 8, further comprising a louver adjacent openings in the inflow conduits and positioned to direct inflow toward a vertex of the V-Shape.

10. The apparatus as in claim 1, further comprising:
    a pellet loading-apparatus having at least one loading pipe extending into the interior region and connected to a loading port, the loading pipe having openings configured to allow pellets to escape therefrom; and,
    a loading blower connected to the loading apparatus during loading, directing a flow of pellets into the loading port.

11. The apparatus as in claim 10, the at least one loading pipe having:
    a plurality of longitudinally spaced openings along each pellet loading pipe, and
    a deflection plate positioned upstream of each of the longitudinally spaced openings and extending radially inward of the pellet loading pipe, the deflection plate deflecting pellets flowing through the pipe from the inlet towards the outlet to exit the outlet until a clog develops, at which time the pellets flowing through the pipe will then exit a longitudinally spaced opening adjacent the clog until it clogs, and then the pellets will exit the pipe from an adjacent opening upstream of the clogged opening, and continuing successively until the longitudinal spaced opening proximate the loading port becomes clogged and the interior region is substantially full.

12. The apparatus as in claim 11, wherein the openings are configured to direct pellet flow outward and toward the left and right walls.

13. The apparatus as in claim 1, wherein the collector comprises a scoop, and the apparatus further includes a left plate connected to the scoop and extending outwardly from the scoop toward the left wall;
    a right plate connected to the scoop and extending outwardly from the scoop toward the right wall.

14. The apparatus as in claim 13, further comprising a left flange and a right flange, each flange extending from the scoop and coupled to a respective plate.

15. The apparatus as in claim 13, wherein each plate slants downward from the scoop in order to channel flow toward the scoop.

16. The apparatus as in claim 13, wherein the center input conduit has an end displaced from the scoop, the end configured to direct air into the collector.

17. The apparatus as in claim 13, wherein the scoop is funnel-shaped, having a large first end connected to each of the plates, and a narrow end connected to the output port.

18. The apparatus as in claim 17, further comprising an extraction conduit connecting the narrow end to the output port.

* * * * *